United States Patent Office 3,462,514
Patented Aug. 19, 1969

3,462,514
GRANULAR UNSATURATED POLYESTER MOLDING COMPOSITION
Albert Robert Kurkowski, Dover, N.J., and Robert Edward Carpenter, Minnetonka, Minn., assignors to Allied Chemical Corporation, New York, N.Y., a corporation of New York
No Drawing. Filed May 23, 1966, Ser. No. 551,959
Int. Cl. C08g 53/02
U.S. Cl. 260—861                    2 Claims

ABSTRACT OF THE DISCLOSURE

This invention relates to a process for preparing granular unsaturated polyester molding compounds by subjecting feed materials including unsaturated polyester resin, unsaturated monomers capable of cross-linking the polyester resin, filler, catalyst and inhibitor, to vortical mixing under such conditions that a granular product is produced.

---

Conventional procedures for the production of granular alkyd molding compounds generally involve mixing the raw materials in a mixer adapted to provide a kneading action to the components. In a representative technique, the raw materials which normally comprise the resin, monomer and additives such as filler, catalyst, inhibitors, and the like are mixed in a mixer such as a sigma blade mixer where mixing of the mass takes place. After a period of time, the mixed mass is thereafter carried to a second zone of operation such as a rolling mill where the material is sheeted. The material is thereafter cooled in a conventional manner such as by passing the material along a cooler conveyor. The cooled sheets are thereafter diced and directed to a conventional granulator where the material is reduced to the desired mesh size. Desirable mesh sizes for commercial operations are usually within the range of from about 8 to 100 mesh. Granular materials produced in the granulator which are finer than 100 mesh are returned to the first mixer for compounding with additional raw material, whereas the coarse material in the granulator that is, material larger than about 8 mesh is fed to a second granulator where further reduction of the size of the granules is effected until a granulated product is produced within the desirable mesh size range for commercial operation. The resultant granular product of suitable mesh size is then ready for additional processing such as coating, blending and finally packaging.

Unfortunately, the conventional procedures for producing granular-type alkyd molding compounds are not entirely satisfactory from a practical commercial standpoint. Conventional procedures require a large number of processing steps and employ equipment which necessitates large areas of flood space. In addition, the granules produced are usually in the form of platelet particles, that is, granules having sharp edges which create operating problems particularly where it is desired to rapidly feed these particles to automatic processing equipment. Moreover, in the conventional procedure for producing alkyd-type granulated molding compounds the fine material which is produced amounts typically to about 1% to 2%. The fine materials represent a loss of product in further handling. A further disadvantage of the conventional procedures is that the equipment utilized to produce the kneading action is cumbersome and the parts which come into contact with the material are not too accessible. As a result, difficulties are encountered when it is desired to clean the equipment particularly when color changes are made. The cleaning costs appreciably add to the cost of processing.

It is an object of the present invention to provide a new and improved process for the production of granular alkyd molding compounds.

Another object is to provide a method for obtaining high grade granular alkyd molding compounds in an efficient and economical manner.

Other objects will be apparent from the following description:

We have found that granular type alkyd molding compounds can be produced in an efficient and economical manner by the process which comprises introducing the feed materials including resin, monomer, filler, catalysts, and inhibitors into a mixing zone wherein the feed materials are subjected to vortical mixing under high shear at least until agglomeration begins, and allowing the temperature within the mixing zone to increase to the softening temperature of the resin, continuing the mixing at this temperature until the mixture begins to form agglomerates; continuing the mixing at approximately the softening temperature of the resin for a period of about 3 to 6 minutes preferably 4 to 5 minutes and thereafter discharging from the mixing zone and cooling said granular alkyd molding compound to produce a granular alkyd molding compound at least 50% of which is of a mesh size to pass through 8 mesh screen, preferably through 12 mesh screen and remain on 100 mesh screen.

The resins may be produced according to well known polyester technology which normally includes the polyesterification of polyhydric alcohols or mixtures thereof such as ethylene glycol, diethylene glycol, propylene glycol, and dipropylene glycol with acidic co-monomers such as alpha, beta- unsaturated halogenated and non-halogenated dicarboxylic acids, or their anhydrides or mixtures thereof. The esterification is carried out at elevated temperatures with the optimum temperature usually being just below the boiling point of the most volatile component of the reaction mixture although temperatures above the boiling point of the more volatile component may be employed provided steps are taken to prevent the escape of the volatile components from the reaction mixture.

Additionally, if desired, a small amount of a catalyst may be employed to hasten the polyesterification reaction. Although the effectiveness of the catalytic agent employed is established for each particular case since it will vary from different materials, the usual polyesterification catalysts such as benzene sulfonic acid para toluene sulfonic acid and the like, may be employed.

The feed material for the production of granular alkyd molding compounds includes a monomer which serves as a cross-linking agent for the polyester resin. Examples of suitable monomers include diallyl phthalate, styrene, vinyl toluene, and methyl methacrylate.

In addition to the above, there is normally included in the feed charge, fillers such as clay, talc, wood flour, asbestos, calcium carbonate lubricants such as zinc stearate, calcium stearate, stearic acid, pigments, inhibitors such as para benzolquinone, phenol and phenol homologs and a catalyst for the cross-linking reaction such as benzoyl peroxide, tertiary butyl perbenzoate and dicumyl peroxide.

The mixing of the feed materials is effected in apparatus designed to provide vortical mixing and high shear rates in the initial stages of the process, that is, the mixing, melting and wetting stages. For this purpose, the mixing device of the apparatus such as the mixing blade should be capable of providing vortical mixing of the components under high shear at least until agglomeration begins.

We have discovered that particularly suitable apparatus for use in the present invention are a class of Prodex-Henschel mixers which are the subject of U.S. Patent 2,945,634, of July 19, 1960, to E. Beck et al. This patent discloses a machine for mixing and comminuting materials and employs the vortical mixing action required in process of the present invention. It was surprising to discover that the apparatus disclosed in the above U.S. Patent 2,945,634 is eminently suitable for producing granular alkyd type molding compounds particularly in view of the fact that the apparatus operates primarily for comminuting or breaking down powdery and granular materials. Our process on the other hand involves mixing and breaking down components to a fine form and thereafter forming agglomerates of the material.

Generally, the mixing vessel is a circular cylinder fabricated of steel, preferably stainless steel, with a rounded juncture at the bottom of the wall. The ratio of height to diameter varies from about 1:2 to 3:2. The mixing blade or impeller device generally comprises two or more pitched blades and rotates on a centrally located shaft positioned close to the bottom of the cylinder. The apparatus is desirably equipped with cooling means, such as a jacket which surrounds the mixing zone through which a cooling medium such as water flows. Optionally and advantageously one or more stationary blades (baffles) are positioned with minimum clearance of the rotating blades to give the high shear rate required.

The manner of introducing the feed material to the mixing zone is not critical and may be accomplished by any of the techniques known in the art. Thus, the feed materials may be introduced into the mixing zone without regard to any particular order. Alternatively and preferably the feed material is broken up into three portions comprising in a first portion the polyester resin, in a second portion the fillers, pigments, lubricants, etc., and in a third portion the catalyst, monomer and inhibitor which are preferably kept separated from the first and second portions before processing time in order to reduce the occurrence of side reactions. The first and second portions are thereafter introduced into the mixing zone and the mixing is begun. After a short period of time of about 3 to 5 minutes, the third portion comprising the catalyst monomer and inhibitor pigments, lubricants, etc., is added to the mixing zone to be admixed with the first and second portions. The temperatures employed for the entire batch of the feed materials should normally be below the temperature required for the formation of agglomerates. For this purpose, temperatures within the range of about 50° C. to 88° C. are suitable for preventing most of the known alkyd compound ingredients from forming agglomerates. The materials in the mixing zone are mixed in a manner to provide vortical mixing accompanied by a high shearing rate. Vortical mixing as employed herein means that the ingredients of the molding compound, together with the air normally intermixed with them are stirred rapidly enough by this arrangement to achieve fluidization of the solid, so that it flows like a liquid. Aside from the revolution of material around the shaft, there is a flow path (see drawing in U.S. Patent 2,945,634) up from the impeller, along and parallel to the walls, and back down towards the center. By action of the mixing device such as the rotor and blade described in the above cited U.S. Patent 2,945,634 the temperature within the mixing zone gradually rises until it reaches the softening point of the resin employed as one of the feed materials. Generally, a temperature within the range of 50° C. to 88° C. covers substantially all of the known commercial resins which are useful in the preparation of the alkd molding compounds. The temperature thereafter is maintained substantially at or slightly above this temperature and the mixing continued until agglomeration begins. Formation of agglomerates may be easily determined by visually examining the mixture or by noting the rapidly increasing power requirement of the mixer motor.

It is essential that the mixing take place for a period of time of about 3 to 6 minutes preferably 4–5 minutes after agglomerates of the material begins to form in the mixing zone. We have found that if mixing is terminated less than about three minutes after the initial formation of agglomerates, then the material within the mixing zone remains as fines and therefore not suitable for most commercial applications. On the other hand, if the mixing is continued for a period of time substantially in excess of about six minutes after initial formation of agglomerates, then excessive formation of coarse material occurs. Thus it is important that vortical mixing of the agglomerates be maintained for a period of about 3 to 6 minutes after initial formation of agglomerates and the mixing is to be maintained substantially at the temperature range in which the softening of the resin material occurs. By following the process of the invention as described, there is produced in the mixing zone granular alkyd molding compounds of suitable particle size for commercial operation. Moreover, the particles are rounded and unlike the platelet type particles produced by conventional procedures.

The following examples will illustrate the present invention:

Example 1

A formulation for preparing Granular Alkyd Molding Compounds was prepared in three separate portions as follows:

|  | Percent | Gram |
| --- | --- | --- |
| Mixture A–polyester resin [1] | 24.40 | 775.43 |
| Mixture B: Witco Clay —2 (Kaolin type clay) | 29.63 | 941.65 |
| Asbestos | 23.56 | 748.73 |
| A purified wood cellulose in floc form | 10.10 | 320.97 |
| Zinc stearate | 1.89 | 60.08 |
| Zinc oxide | 4.88 | 155.09 |
| Yellow iron oxide | 2.01 | 63.87 |
| Mixture C: Diallyl phthalate | 2.50 | 79.45 |
| Initiator—(50% benzol peroxide in tricresyl phosphate) | 1.00 | 31.78 |
| A substituted phenolic inhibitor | .03 | 0.95 |
|  | 100.00 | 3,178.0 |

[1] As described in U.S. Patent 2,632,751, issued March 24, 1953, to Thomas F. Anderson.

Mixture A was broken up into small pieces and stored in a cold room until processing time. The second mixture B comprising the filler, lubricant, pigment, etc. was weighed up in a second container. Mixture C comprising a catalyst, monomer, and inhibitor was also weighed up in a separate container and subjected to a thorough mixing.

Mixtures A and B above were charged into a mixer of the general type shown in U.S. Patent 2,945,634, equipped with baffles and blades at a mixer motor speed of about 1800 r.p.m. After a period of about 3 minutes, Mixture C was added to the mixing zone without cooling the mixing zone. The temperatures were allowed to increase to about 70° C. at which time water cooling of the mixing zone was started at the rate of about 2.5 pounds per minute. The water cooling was sufficient to maintain the temperature in the range of about 70° C. to 80° C. Periodic visual observations of the mixing zone were made in order to determine when the components of the mixture began to form agglomerates and the mixing was continued for an additional 4 minutes after initial formation of agglomerates. The material was thereafter discharged and cooled. Analysis of the materials indicated that they were in the form of rounded granules. They were tested with United States Standard Sieves in order to determine the mesh size. Screen analysis results are indicated below:

|  | Percent |
| --- | --- |
| On 12-mesh screen | 2.2 |
| On 20-mesh screen | 12.0 |
| On 100-mesh screen | 85.3 |
| Through 100-mesh screen | 0.5 |

Example 2

The equipment utilized was similar to that employed in Example 1. A formulation was prepared as in Example 1, and utilizing the same procedure, water cooling at the rate of 35 to 40 pounds per minute was begun when the batch temperature reached about 60° C. This water cooling was sufficient to maintain the batch temperature in the limits 70° C. to 80° C. The mixing was continued for an additional 6 minutes after initial formation of agglomerates as determined by visual observation and thereafter the material was discharged and cooled. The results of screening on United States Standard Sieves are indicated below:

| | Percent |
|---|---|
| On 8-mesh | 41.3 |
| On 12-mesh | 12.9 |
| On 20-mesh | 27.2 |
| On 40-mesh | 16.3 |
| On 70-mesh | 2.2 |
| On 100-mesh | .06 |
| Through 100-mesh | .03 |

The coarse (on 8-mesh and on 12-mesh screens) were stored until enough was accumulated to be broken up in the cold state in the same mixer to acceptable size. The acceptable material (through 12-mesh) was then coated with a conditioner, blended and packaged.

Examples 3 and 4

The procedure, process conditions, and equipment employed in these examples were the same as in Example 2. Two runs were made one for each example and two samples from each run were screened on United States Standard Sieves. The results are indicated below:

| Mesh | Example 3, percent | | Example 4, percent | |
|---|---|---|---|---|
| | SPL. 1 | SPL. 2 | SPL. 1 | SPL. 2 |
| On 8 | 9.0 | 8.0 | 15.1 | 14.3 |
| On 12 | 5.6 | 5.7 | 6.2 | 6.0 |
| On 20 | 13.8 | 14.4 | 15.3 | 15.2 |
| On 40 | 28.1 | 27.8 | 30.9 | 31.4 |
| On 70 | 36.0 | 36.9 | 28.4 | 29.3 |
| On 100 | 6.0 | 6.1 | 2.9 | 2.8 |
| Through 100 | 1.5 | 1.1 | 1.1 | 1.0 |

Examples 5 and 6

The procedure, process conditions, and equipment employed were the same as in Example 2 except that the formulation was as follows:

| | Weight Percent |
|---|---|
| Mixture A: | |
| Polyester resin (described in Example 1) | 25.36 |
| Mixture B: | |
| Kaolin | 30.70 |
| Asbestos | 17.60 |
| 1/8" glass fiber | 10.00 |
| Zinc stearate | 1.93 |
| Antimony oxide | 4.83 |
| Barium carbonate | 4.83 |
| Chrome Orange | 0.50 |
| Mapico Brown | 0.20 |
| Mixture C: | |
| DAP (diallyl phthalate) | 2.83 |
| Initiator (50% benzoyl peroxide in tricresyl phosphate) | 1.18 |
| A substituted phenolic inhibitor | .03 |

Two runs were made one for each example and two samples from each run were screened on United States Standard Sieves. The results are indicated below:

| Mesh | Example 5 | | Example 6 | |
|---|---|---|---|---|
| | SPL. 1 | SPL. 2 | SPL. 1 | SPL. 2 |
| On 8 | 36.6 | 36.1 | 24.2 | 23.4 |
| On 12 | 18.6 | 19.3 | 17.0 | 16.9 |
| On 20 | 35.1 | 35.4 | 39.1 | 38.8 |
| On 40 | 9.0 | 8.7 | 15.3 | 15.7 |
| On 70 | 0.5 | 0.4 | 3.54 | 4.2 |
| On 100 | .06 | .10 | .5 | .6 |
| Through 100 | .03 | .03 | .3 | .4 |

Although certain select formulations have been disclosed in the examples, these are merely representative of the various formulations which may be employed in the invention. In actual practice, molding compounds may be selected from those thermo-plastic compounds which have a low enough consistency to flow in the pattern we have described as vortical mixing. For instance, the formulation of Examples 5 and 6 contain about 10% glass fibers (1/8" length), and we have found that this formulation can be subjected to vortical mixing to produce granular alkyd molding compounds.

Although certain preferred embodiments of the invention have been disclosed for the purposes of illustration, it will be evident that various changes and modifications may be made therein without departing from the scope and spirit of the invention.

We claim:

1. A process for producing granular unsaturated polyester molding compounds which comprises introducing the feed materials including unsaturated polyester resin, unsaturated monomer capable of cross-linking the polyester resin through the unsaturation of said polyester, filler, catalyst, and inhibitor into a mixing zone wherein the feed material are subjected to vortical mixing under high shear at least until agglomeration begins and allowing the temperature within the mixing zone to increase to the softening temperature of the resin, continuing the mixing at this temperature until the mixture begins to form agglomerates, continuing the mixing at approximately the softening temperature of the resin for a period of about 3 to 6 minutes, and thereafter discharging from the mixing zone and cooling said granular alkyd molding compound to produce a granular alkyd molding compound at least 50% of which is of mesh size to pass through 8 mesh screen and remain on 100 mesh screen.

2. A process according to claim 1 wherein the mixing of the materials is continued at approximately the softening temperature of the resin for a period of about 4-5 minutes after the mixture begins to form agglomerates, and wherein there is produced a granular alkyd molding compound at least 50% of which is of a mesh size to pass through 12 mesh screen and remain on 100 mesh screen.

References Cited

UNITED STATES PATENTS

| 2,454,539 | 11/1948 | Beavers | 260—75 |
| 2,492,086 | 12/1949 | Baer | 260—23 |
| 2,945,634 | 7/1960 | Beck et al. | 260—34.2 |

OTHER REFERENCES

Simonds: Encyclopedia of Plastics Equipment; Reinhold Publishing Corp.; 1964; pp. 363, 364.

MORRIS LIEBMAN, Primary Examiner

L. T. JACOBS, Assistant Examiner

U.S. Cl. X.R.

260—40